(12) United States Patent
Hoefelmayr

(10) Patent No.: US 9,468,191 B2
(45) Date of Patent: Oct. 18, 2016

(54) DEVICE FOR CARRYING OUT AT LEAST ONE MEASUREMENT AND FOR TAKING MILK SAMPLES FROM A MILKING MACHINE

(75) Inventor: Tilman Hoefelmayr, Niederteufen (CH)

(73) Assignee: LACTOCORDER AG, Niederteufen (CH)

( * ) Notice: Subject to any disclaimer, the term of this patent is extended or adjusted under 35 U.S.C. 154(b) by 114 days.

(21) Appl. No.: 14/115,820

(22) PCT Filed: May 9, 2012

(86) PCT No.: PCT/EP2012/001994
§ 371 (c)(1), (2), (4) Date: Feb. 7, 2014

(87) PCT Pub. No.: WO2012/152441
PCT Pub. Date: Nov. 15, 2012

(65) Prior Publication Data
US 2014/0174598 A1 Jun. 26, 2014

(30) Foreign Application Priority Data
May 9, 2011 (DE) .................. 10 2011 100 924

(51) Int. Cl.
*A01J 11/00* (2006.01)
*A01J 11/04* (2006.01)
*A01J 5/04* (2006.01)

(52) U.S. Cl.
CPC ............... *A01J 11/04* (2013.01); *A01J 5/045* (2013.01)

(58) Field of Classification Search
CPC .............. A01J 11/04; A01J 11/06; A01J 5/01
See application file for complete search history.

(56) References Cited

U.S. PATENT DOCUMENTS 3,349,618 A * 10/1967 Maxwell ............ A01J 5/01 73/202
3,776,189 A 12/1973 Fjermestad et al.
(Continued)

FOREIGN PATENT DOCUMENTS

| CN | 201084957 Y | 7/2008 |
| CN | 201563465 U | 9/2010 |

(Continued)

OTHER PUBLICATIONS

Patent Translate EP0322264. (n.d.). Retrieved Oct. 29, 2015, from European Patent Office.*

(Continued)

*Primary Examiner* — Monica Williams
*Assistant Examiner* — Aaron Rodziwicz
(74) *Attorney, Agent, or Firm* — Flynn, Thiel, Boutell & Tanis, P.C.

(57) ABSTRACT

A device for carrying out at least one measurement and for removing milk samples from a milking machine, through which milk can flow and which contains an air separation device, a measurement device, a sample removal device and a channel that is open to the top. The air separation device is designed to separate the milk from air with which the milk is mixed. The measurement device is device and is connected to the air separation device by a first milk outlet opening of the air separation device and designed to carry out one or more measurements with the milk flowing through the device. The sample removal device is designed to supply milk to a sample container.

18 Claims, 9 Drawing Sheets

(56) References Cited

U.S. PATENT DOCUMENTS

| | | |
|---|---|---|
| 4,391,222 A | 7/1983 | Icking et al. |
| 4,452,176 A | 6/1984 | Hoefelmayr et al. |
| 5,746,153 A | 5/1998 | Hoefelmayr |
| 2011/0283810 A1 | 11/2011 | Hoefelmayr |

FOREIGN PATENT DOCUMENTS

| | | | |
|---|---|---|---|
| CN | 201657674 U | 12/2010 | |
| DE | 201 963 | 8/1983 | |
| DE | 252 531 | 12/1987 | |
| DE | 697 06 450 | 4/2002 | |
| DE | 10 2008 057 819 | 5/2010 | |
| EP | 0 134 836 | 3/1985 | |
| EP | 0322264 A1 * | 6/1989 | ............ A01J 5/01 |
| EP | 0 643 292 | 3/1995 | |
| FR | 2623618 A2 * | 5/1989 | ............ A01J 5/01 |
| GB | 1 564 141 | 4/1980 | |
| JP | 49-29508 | 8/1974 | |
| JP | 52-34280 | 3/1977 | |

OTHER PUBLICATIONS

International Search Report (2 pages).
German Search Report (5 pages).
First Examination Report of New Zealand Intellectual Property Office issued in Application No. 618689 dated Aug. 19, 2014 (2 pages).
New Zealand Intellectual Property Office—Case Details Report issued in Application No. 207284 together with specification dated Sep. 8, 2014 (19 pages).
Office Action of Chinese Intellectual Property Office issued in Application No. 201280033900.5 with English translation dated Aug. 26, 2014 (10 pages).

* cited by examiner

DEVICE FOR CARRYING OUT AT LEAST ONE MEASUREMENT AND FOR TAKING MILK SAMPLES FROM A MILKING MACHINE

FIELD OF THE INVENTION

The present invention relates to milking technology, and in particular to a device for carrying out milk measurements and for taking milk samples during a milking process.

BACKROUND OF THE INVENTION

In modern agriculture, it is desirable to know the properties of the milk milked from an animal (such as a cow, a goat or a sheep). The milk quantity and the concentration of specific substances of content, in particular the concentrations of protein and fat, as well as the number of cells in the milk form a basis for the milk price paid to the farmer. To this end, samples of the milk are examined. Milk samples may also be used for judging the condition of an animal, in particular its productivity and/or health, and they may serve as a basis for breeding selection in genetic programs.

A simple method of taking a sample from the whole milk delivered by a farmer is taking a sample by means of a long-stemmed ladle from the farmer's collecting tank equipped with cooling and stirring facilities. Due to creaming of the milk, the milk must be thoroughly stirred prior to taking a sample so as to obtain homogeneously mixed milk, but this entails the drawback that, during stirring, the fat globules contained in the milk may be damaged and the quality may thus be impaired by lipolysis.

Alternatively, a milk sample may also be taken while the milk is being pumped from the farmer's collecting tank into the milk tanker of the dairy factory. To this end, fully automatic sampling devices are used, which, however, are normally very complex and expensive. In addition, a mixture of milk from a plurality of animals is examined, just as in the case of sampling from the farmer's collecting tank. For examining the condition of an animal on the basis of a milk sample, a milk sample originating from a single animal is, however, desirable.

A prior art device for milk yield determination and for the early diagnosis of health problems, which allows milk samples to be taken from individual animals, is disclosed in DD 252 531 A1. The device comprises a cyclone and a unit for selectively taking milk samples. The upright cyclone, which has a horizontal milk inlet at the upper end thereof, has incorporated therein a light source located on the longitudinal axis of the cyclone. On the circumference of the cyclone, sensors are provided for examining the milk, said sensors comprising light sensors. In front of the discharge funnel of the cyclone and below, i.e. downstream of, the sensors, an annular groove is provided, which extends radially outwards and through which a milk sample can be sucked off by means of a vacuum.

In the lower area of the cyclone, where the annular groove used for sampling is located, the circulatory movement of the milk has already slowed down to such an extent that there is no longer any centrifugal force that would be worth mentioning and that would drive the milk into the annular groove. Instead, adhesive and cohesive forces are effective, which depend on various factors, such as the composition of the milk, the material and the surface properties of the cyclone as well as the cleaning condition of the latter. These factors are not controllable precisely in practice.

Moreover, the vacuum acts on the entire circumference of the annular groove. According to DD 252 531 A1 only part of the annular groove is, however, covered with milk. The vacuum therefore sucks in a large amount of air in addition to the milk, and this air will offer less resistance than the milk when being sucked off. This leads to a reduction of the suck-off vacuum. In addition, pressure fluctuates within the cyclone due to the irregularly pulsating flow of the milk yield into the cyclone and is also dependent on the flow of milk at the moment in question. The intensity of the suck-off vacuum, the differential vacuum, which acts on the milk will, however, decisively influence the quantity of the sample taken.

In view of these properties of the device according to DD 252 531 A1, accurate extraction of a sample quantity representative of the milk yield is not possible, especially as regards small milk flows which occur at the beginning or at the end of the milking process and in the case of which only a small part of the circumference of the cyclone is covered by the milk flowing down.

A prior art device configured for taking from a milking flow an analysis sample in proportion to the quantity of said milking flow is described in EP 0 643 292 A2. The device comprises a milk flow measuring device with a measuring and collecting chamber in which the milk yield is backed up and flows off via a measuring slit into a sump. The flow of milk can be determined from the measured storage level of the milk in the measuring and collecting chamber. A milk sampling device is arranged downstream of the measuring and collecting chamber. The milk sampling device comprises a magnetic valve whose opening and closing times are controlled in response to various variables, in particular in response to the milk flow measured.

The milk to be examined is backed up in the measuring and collecting chamber and is thus stored intermediately for a certain period of time. This has the effect that the newly incoming milk mixes with older milk that is already contained in the measuring and collecting chamber. In the course of a milking process, the composition of the milk delivered by the animal varies. The largest variation is that occurring with respect to the fat content. Therefore, a milk sample taken from the measuring and collecting chamber or at a point downstream of the measuring and collecting chamber does not correspond to the milk delivered by the animal at the moment in question. Instead, an internal carryover between the older milk and the new milk will occur, depending on the amount of intermediately stored milk. This carryover may make it more difficult to take a milk sample representative of the milk.

For activating the magnetic valve of EP 0 643 292 A2, a comparatively complicated and computationally intensive control is necessary, which means that numerous and expensive electronic components are required. The magnetic valve necessitates comparatively high currents, and this may entail problems in cases where batteries which are not resistant to high currents, such as lithium-ion batteries, are used. In addition, small-diameter lines are used in this device, which, if not properly cleaned, may easily be clogged by caseated milk.

The sample bottle is arranged below the measuring and collecting chamber in the device of EP 0 643 292 A2, and this entails the risk of damage that may be caused to the sample bottle and/or the flange to which the sample body is connected.

OBJECTS OF THE INVENTION

It is an object of the present invention to provide a device with which some or all of the above-mention drawbacks of the prior art can be avoided.

In particular, it is an object of the present invention to provide a device with which a mixing of milk that has been milked at different times can be avoided or at least reduced prior to sampling.

It is a further object of the present invention to provide a device allowing a reliable extraction of milk samples even in the case of small milk flows occurring especially at the beginning and at the end of the milking process.

According to the present invention, the object is achieved by a device for carrying out at least one measurement and for taking milk samples from a milking machine. The device allows milk to flow therethrough and comprises an air separation device, a measurement device, a sampling device and an upwardly open channel. The air separation device is configured for separating the milk from air with which the milk is mixed. The measurement device is arranged downstream of the air separation device. It is connected to the air separation device through a first milk outlet opening of the air separation device and configured for carrying out one or a plurality of measurements with the milk flowing through the device. The sampling device is configured for supplying milk to a sample container. The upwardly open channel is arranged upstream of the measurement device and configured for accommodating at least a part of the milk, which has been separated from the intermixed air in the air separation device, and conducting said milk such that it flows at least partially to the sampling device.

In the device according to the invention milk samples are taken upstream of the measurement device. The milk samples are thus taken directly from the milk flowing in from the milking machine, without the milk being backed up or the flow of milk being substantially decelerated, as may happen in measurement devices, in particular in measurement devices used for measuring a flow of milk. A mixing of milk that has been milked at different times and falsifications due to creaming of the milk can thus be avoided or at least be reduced.

By means of the upwardly open channel the milk is collected and conducted precisely to the sampling device. Thus, the sampling device will be supplied with milk even if the flow of milk should be very small.

In some embodiments, the air separation device comprises a second milk outlet opening. The sampling device is arranged such that milk exiting the second milk outlet opening flows to the sampling device. The upwardly open channel is arranged at a downstream end of the air separation device and upstream of the first milk outlet opening and configured for conducting milk to the second milk outlet opening of the air separation device.

The upwardly open channel can thus capture a part of the milk already in the air separation device before the milk arrives at the first milk outlet opening, whereby milk can be conducted to the sampling device in a particularly reliable manner.

In some embodiments a depth and/or a width of the channel increases from an end of the channel facing away from the second milk outlet opening to the second milk outlet opening. Due to the increasing depth, the milk flows along the channel downhill to the second milk outlet opening, whereby the flow of milk to the sampling device is improved still further. Also the increasing width can improve the flow of milk to the sampling device.

In some embodiments, the air separation device comprises a cup with a milk inlet opening through which milk enters the cup in a direction tangential to an inner wall of the cup. The upwardly open channel as well as the first and the second milk outlet opening are located in the bottom of the cup. The channel extends along a circumference of the first milk outlet opening.

Due to the centrifugal force acting on the milk-air mixture flowing tangentially along the inner wall of the cup, the milk and the air are separated from one another. The milk flows down to the bottom of the cup, where the channel and the two milk outlet openings are located, so that the milk supplied thereto will only contain a low percentage of air. The measurement device and the sampling device can thus have supplied thereto milk containing only a small percentage of air. Since the channel extends along a circumference of the first milk outlet opening, it can capture milk flowing to the first milk outlet opening, before said milk arrives at the first milk outlet opening, and supply it to the second milk outlet opening, whereby the supply of milk to the sampling device can be improved, especially in the case of small milk flows.

In some embodiments, the first milk outlet opening may be arranged at the center of the bottom of the cup.

In some embodiments, the device comprises a strainer arranged downstream of the first and the second milk outlet opening and sloping obliquely in a direction from the second milk outlet opening towards the sampling device, so that milk exiting the air separation device through the second milk outlet opening flows along the lower surface of the strainer to the sampling device. The milk is here held by cohesive forces on the lower surface of the strainer. Since closed pipes are thus not necessary for conducting the milk from the second milk outlet opening to the sampling device, problems such as clogging through foreign matter or an accumulation of caseated matter within tubular lines can be avoided. Larger foreign bodies and solid or viscous components of the milk can be captured by the strainer. An impairment of sampling through foreign matter and/or milk components, which may occur in prior art devices making use of pipes having a narrow cross-section, can thus be reduced.

In some embodiments, the strainer is conical in shape. A cone axis of the strainer extends through the first milk outlet opening, and the sampling device is arranged on an edge of the strainer. Due to the conical shape, an oblique slope of the strainer can be accomplished. Since the cone axis extends through the first milk outlet opening, a flow of milk from the first milk outlet opening to the sampling device can be accomplished in addition to the flow of milk from the second milk outlet opening to the sampling device, especially when the flow of milk is comparatively large.

In some embodiments, the channel may be arranged downstream of the first milk outlet opening.

In some embodiments, the measurement device comprises a container for intermediately storing milk during the measurement. In some of these embodiments, the measurement device additionally comprises a filling-level meter configured for measuring a filling level of milk in the container, and an evaluation unit configured for calculating a flow of milk into the container from the size of the discharge opening and the filling level measured by the filling-level meter. This allows a precise determination of the flow of milk into the device and, by temporally integrating the milk flow, of the hitherto milked quantity of milk.

In some embodiments, at least a part of the sampling device is located in a part of the container facing the air separation device. In the interior of the container, the sampling device is protected against mechanical damage and, when the container is cleaned, it can be cleaned together therewith.

In some embodiments, the sample container is arranged in side-by-side relation with the container. In comparison with an arrangement below the container, used in most systems according to the prior art, the sample container is thus less likely to be knocked off and/or pushed out of its support under rough conditions of practical use. Leakage of the sample container mount, which may lead to troublesome pressure differences between the interior of the container and the sample container, can be, among other difficulties, be avoided in this way. Such pressure differences influence the sample quantity as well as the representativity and may impede or completely prevent the supply of the samples into the sample container. In addition, a more compact shape and, consequently, improved handling of the device can be achieved by arranging the sample container in side-by-side relation with the container.

In some embodiments, the sampling device comprises a slide with a volume for accommodating a predetermined milk quantity as well as with an inlet opening and an outlet opening. The slide is movable between a first and a second position. The device further comprises a drive for moving the slide between the first and the second position. A structure closes the outlet opening and opens the inlet opening when the slide occupies the first position. When the slide occupies the second position, the structure closes the inlet opening and opens the outlet opening, so that milk will flow out of the volume and into the sample container. By moving the slide back and forth between the first and the second position by means of the drive, a respective amount of milk corresponding to the volume of the slide can be transferred to the sample container, largely independently of the pressure prevailing and the flow of milk taking place at the moment in question. The inlet opening and the outlet opening do not intersect at any moment in time. A desired amount of milk can thus reliably be taken as a sample.

In some embodiments, the slide is movable between the first position and the second position by a rotary motion.

In some embodiments, the measurement device is configured for measuring a milk flow, and the sampling device includes a control means configured for operating the slide whenever the milk quantity flown has increased by a predetermined volume increase. A milk quantity proportional to the milk flow in good approximation can thus be filled into the sample container, so that the sample will be representative of the milk that has flown through the device.

In some embodiments, the drive for moving the slide between the first and the second position includes an electric motor. In comparison with magnetic valves, which are used in the prior art, an electric motor can be operated with low currents, which allows the use of high-capacity batteries which are not resistant to high currents, such as lithium-ion batteries.

In some embodiments, the structure includes an overflow trough with an outlet opening, which is arranged such that, at the first position of the slide, milk flows out of the outlet opening of the overflow trough into the volume of the slide. The overflow trough is able to store an amount of milk which can then flow into the volume of the slide at a rate that is largely independent of the milk flow taking place at the moment in question. Thus, it can be guaranteed that the slide will be filled completely.

In some embodiments, the device comprises means for equalizing the pressure between the sample container and the surroundings of the sampling device. Pressure differences between the sample container and the sampling device, which may interfere with the flow of milk from the sampling device into the sample container, can be avoided in this way.

In some embodiments, the device further comprises a second sampling device configured for supplying milk to a second sample container and arranged such that milk will flow from the air separation device to the second sampling device. In some of these embodiments, the device may additionally comprises a control means configured for operating the first and the second sampling device during various phases of a milking process. Thus, milk samples can be taken, which are representative of the composition of the milk during different phases of the milking process.

BRIEF DESCRIPTION OF THE DRAWINGS

In the following, embodiments of the invention will be described with reference to the figures, in which.

DETAILED DESCRIPTION OF THE INVENTION

Figure 1:
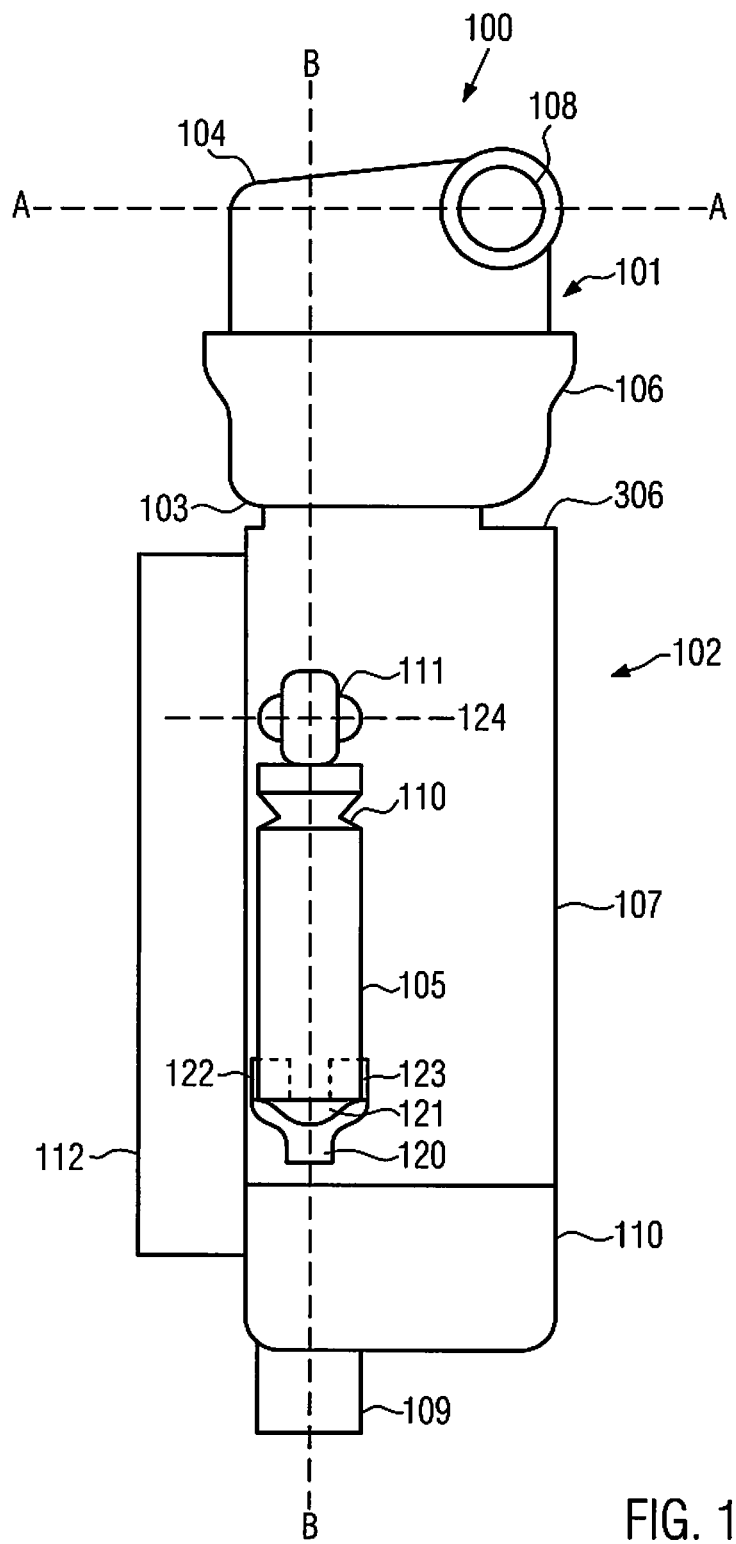
FIG. 1 shows a schematic side view of a device according to an embodiment of the present invention.
Figure 2:
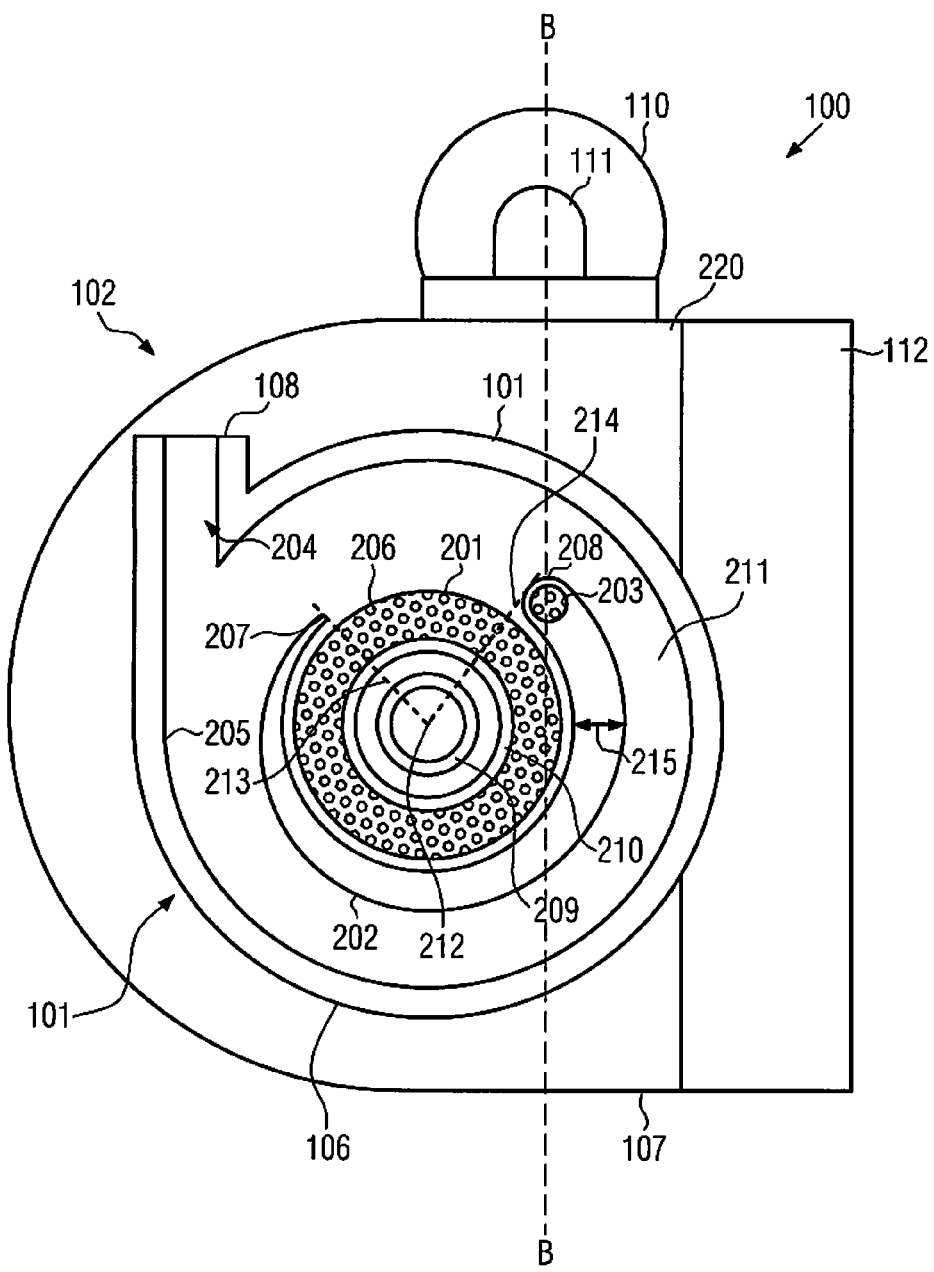
FIG. 2 shows a schematic sectional drawing of the device shown in FIG. 1.
Figure 3:
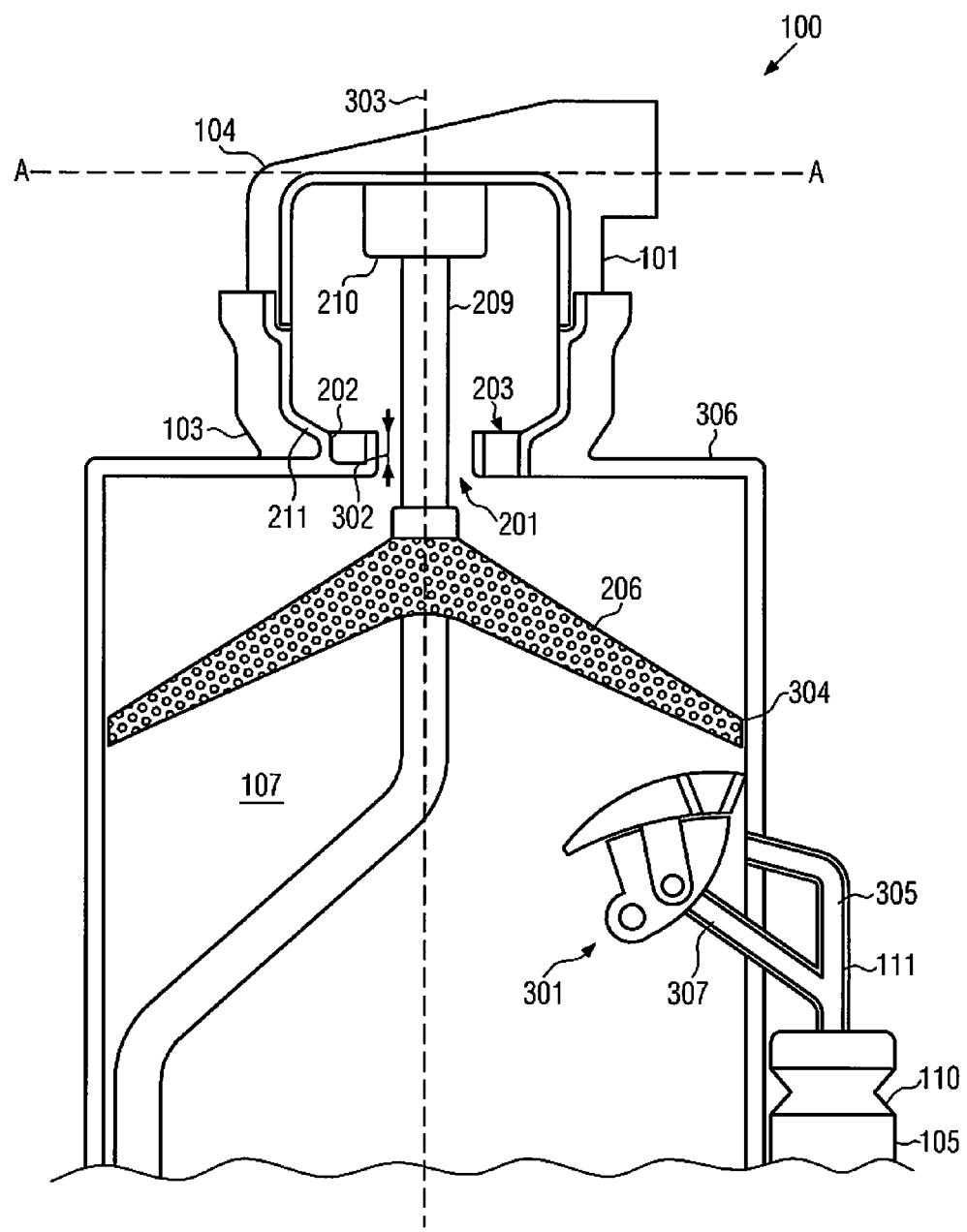
FIG. 3 shows an additional schematic sectional drawing of the device shown in FIG. 1.

FIG. 1 shows a schematic side view of a device 100 for carrying out a measurement and for taking milk samples from a milking machine according to an embodiment of the present invention. A sectional view of the device 100 along a plane A-A is shown in FIG. 2. FIG. 3 shows a sectional view of an upper part of the device 100 along a plane B-B.

The device 100 comprises a first connection 108 and a second connection 109. When the device 100 is in operation, the first connection 108 may be connected to the milking cluster of a milking machine and the second connection 109 may be connected to a milking line of the milking machine leading to a milk tank. During a milking process carried out by the milking machine, milk milked from an animal (e.g. a cow, a goat or a sheep) then flows through the first connection 108 into the device 100. The milk coming from the milking cluster is normally mixed with transport air so that, in addition to the milk, also air flows through the connection 108 into the device 100. Through the second connection 109 the milk and the transport air can leave the device 100 so that milk (and air) flow through the device 100.

The direction in which the milk flows through the device 100 during operation defines a direction of flow. In the following, a first part of the device 100 will be referred to as being located "upstream" of a second part of the device 100, when milk flowing along the flow direction through the device 100 arrives at the first part prior to arriving at the second part. If, however, the milk flowing along the flow direction arrives at the second part prior to arriving at the first part, the first part will be referred to as being located "downstream" of the second part.

The device 100 has a vertical direction which extends parallel to plane B-B and at right angles to plane A-A. When the device 100 is in operation, it can be arranged such that the vertical direction extends perpendicularly, the device 100 being then oriented in the way shown in FIG. 1, i.e. a first part of the device 100, shown in FIG. 1 above a second part, is located above the second part when the device 100 is in operation. In the following, the terms "vertical", "horizontal", "above" and "below" will be used in accordance with this orientation of the device 100.

Therefore, the milk fundamentally flows through the device 100 from the top to the bottom, when the device is in operation. In certain parts of the device the flow direction may, however, deviate from the vertical direction. In particular, the flow direction may be horizontal in some parts of the device or it may have a horizontal as well as a vertical component.

The device 100 includes an air separation device 101. The air separation device 101 comprises a cup 106, which may be substantially rotationally symmetric in shape with a vertical axis of symmetry. The first connection 108 ends in a milk inlet opening 204 of the cup 106 leading into the interior of the cup 106. The milk inlet opening 204 is located at an upstream end 104 of the air separation device 101 located above a downstream end 103 of the air separation device 101.

The milk inlet opening 204 is arranged such that the milk-air mixture flowing through the first connection 108 into the device 100 moves first in a substantially horizontal direction tangentially to an inner wall 205 of the cup 106. This leads to a rotational movement of the milk-air mixture along the inner wall of the cup 106.

Due to the rotational movement, a centrifugal force is created, which pushes the milk towards the inner wall 205 of the cup 106, whereas the lighter air moves towards the center of the cup 106, where it can flow out of the air separation device 101 through a bypass line 209. A downwardly open annular structure 210 may be arranged around the upwardly open upper end of the bypass line 209, said annular structure preventing milk droplets from entering the bypass line 209. In FIG. 3 the upper end of the bypass line 209 is concealed by the annular structure 210.

When the rotational speed of the milk has sufficiently slowed down through friction with the inner wall 205 of the cup 106, the milk can flow along the inner wall 205 downwards to the downstream end 103 of the cup 106.

The cup 106 has a bottom 211 at its downstream end 103. The bottom 211 includes an upwardly open channel 202, a first milk outlet opening 201 and a second milk outlet opening 203.

The first milk outlet opening 201 may be substantially circular and it may be located at the center of the cup 106 so that its center 212 is positioned on the axis of symmetry of the cup 106. The upwardly open channel 202 may be curved in shape and extend along a circumference of the first milk outlet opening 210. The second milk outlet opening 203 may be located at a first end 208 of the upwardly open channel 202, a depth 302 of the channel 202 increasing in a direction from a second end 207 of the channel 202, which faces away from the second milk outlet opening 203, towards the first end 208. Also a width 215 of the channel 202 may increase from the second end 207 to the first end 208 so as to take into account the milk that flows in over the outer edge of the channel and that is added to the milk flowing already along the channel from the second end 207 to the first end 208.

The direction from the second end 207 to the first end 208 of the channel 202 may run around the first milk outlet opening 201 in a direction of rotation corresponding to the direction in which the milk-air mixture enters the air separation device 101 through the opening 204. The movement of the milk in the channel 202 to the second milk outlet opening 203 can thus be prevented from being decelerated by a rotational milk movement still existing on the bottom 211 of the cup 106. Instead, the movement of the milk in the channel 202 will be supported by the rotational movement of the milk when the channel 202 is arranged in this way. The flow of milk to the second milk outlet opening 203 can thus be promoted.

Milk flowing along the inner wall 205 of the cup 106 downwards, moves along the bottom 211 of the cup 106 to the center of the latter. In so doing, the milk may arrive at the channel 202 before it arrives at the first milk outlet opening 201 and flow along the channel 202 to the second milk outlet opening 203.

In embodiments in which the depth 302 of the channel 202 increases from the second end 207 to the first end 208, at which the second milk outlet opening 203 is located, a slope promoting the flow of milk to the second milk outlet opening 203 is provided, whereby the flow of milk through the second milk outlet opening 203 will be improved. In other embodiments, the depth 302 of the channel 202 may, however, also be constant.

The flow of milk varies strongly during the milking process. Whereas at the beginning and at the end of the milking process small flows of milk occur (order of magnitude of approx. 0.05 kg/min in the case of cows), large flows of milk (up to approx. 12 kg/min in the case of cows) may occur in the middle of the milking process.

When the flows of milk are small, a large part of the milk flowing through the first connection 108 into the air separation device 101 can be collected by the channel 202 and conducted to the second milk outlet opening 203, so that a large part of the milk will leave the air separation device 101 through the second milk outlet opening 203.

When the flows of milk are, however, large, milk may flow over the channel 202 and leave the air separation device 101 through the first milk outlet opening 201. However, in addition to the flow of milk through the first milk outlet opening 201, a flow of milk through the second milk outlet opening 203 will occur also in the case of large milk flows, since part of the milk is conducted through the channel 202 to the second milk outlet opening 203 or arrives directly at the second milk outlet opening 203.

An angle formed between a straight line 213 extending through the center 212 of the first milk outlet opening 201 and the first end 208 of the channel 202 and a straight line 214 extending through the center 212 of the first milk outlet opening 201 and the second end 207 of the channel 202 may be larger than 180°, and have e.g. a value in a range of from 270° to 340°, so that the channel extends over a major part of the circumference of the first milk outlet opening 201. In the case of small milk flows, most of the milk flowing through the air separation device 101 can thus be collected by the channel 202.

A cross-sectional area of the first milk outlet opening 201 can be configured such that, even with the maximum flow of milk to be expected, the whole amount of milk could flow through the first milk outlet opening, without any backup occurring in the air separation device 101. In some embodiments, the first milk outlet opening 201 may have a cross-sectional area of 5 to 11 $cm^2$.

A cross-sectional area of the second milk outlet opening 203 may be configured such that an amount of milk which suffices for taking therefrom a desired sample quantity will flow through the second milk outlet opening 203. In some embodiments, the second milk outlet opening 203 may have a cross-sectional area of 0.3 $cm^2$.

The device 100 additionally includes a measurement device 102. The measurement device 102 is connected to the air separation device 101 through the first milk outlet opening 201 of the air separation device 101. Milk flows through the first milk outlet opening 201 to the measurement device 102, the milk reaching the measurement device 102 only after having passed the air separation device 101. The measurement device 102 is thus arranged downstream of the air separation device 101. In some embodiments, the measurement device 102 may be arranged below the air separation device 101.

The measurement device 102 may comprise a container 107 used for storing the milk intermediately during the measurement. The first milk outlet opening 201 and the second milk outlet opening may extend through a cover 306 of the container 107.

The air separation device 101 may be configured such that it can easily be separated from the container 107. For example, the air separation device 101 and the container 107 may be screwed together or interconnected by a bayonet joint. The air separation device 101 can thus be removed from the container 107 for the purpose of cleaning the device 100.

In some embodiments, the container 107 includes a discharge opening which may be provided in a bottom of the container as well as a filling-level meter for measuring a filling level of milk in the container 107. The higher the filling level of milk in the container 170 is, the higher the pressure which the milk applies to the discharge opening will be, so that more milk will exit the container 107 when the filling level is comparatively high.

Depending on the flow of milk into the container 107, a filling level may therefore occur, at which the flow of milk through the discharge opening is equal to the flow of milk into the container, so that the filling level of the milk in the container is a measure of the flow of milk through the device 100. The measurement device 102 may include an evaluation unit configured for calculating the flow of milk into the container 107 from the known size of the discharge opening and the filling level measured by the filling-level meter. In some embodiments, the size of the discharge opening may be variable so as to obtain a larger measurement range.

When the milk has flown through the discharge opening out of the container 107, it may be re-united with the transport air flowing through the bypass line 209 prior to leaving the device 100 through the second connection 109. The means for uniting the milk and the transport air and/or means for varying the size of the discharge opening may be located in a lower part 110 of the device 100.

In some embodiments, the measurement device 102 may have features corresponding to those of the device described in DE 10 2008 057 819 A1.

In other embodiments, the measurement device 102 may also include a device for measuring a milk flow of some other type.

In addition to and/or alternatively to a device for measuring a milk flow, the measurement device 102 may comprise additional measurement equipment, e.g. a measurement equipment for measuring a temperature or a content of protein, fat and/or lactose, and/or devices for determining a concentration of cells and/or specific cell classes in the milk. Such a measurement equipment may be configured to perform online measurements with the aid of near-infrared technology or with the aid of so-called biological sensors.

The additional measurement equipment may be arranged in side-by-side relation with the container 107 and, in some embodiments, it may be filled and emptied by the force of gravity of the milk flowing downwards within the device 100, e.g. by means of lines leading out of the container 107 on a lateral surface thereof. Arranging the additional measurement equipment in side-by-side relation with the container 107 offers, in comparison with an arrangement below the container 107, the advantage of a more compact structural design.

The device 100 additionally comprises a sampling device 301 which, in some embodiments, is located in an upper part of the container 107 facing the air separation device 101 and which is configured for supplying milk to a sample container 105. The sample container 105 may be a sample bottle, e.g. a commercially available analysis bottle having a volume in the range of 20 to 100 ml, e.g. a volume of 50 ml. A sampling device 301 that may be used in an embodiment of the present invention will be described in more detail hereinbelow.

The sample container 105 may be connectable to a sample container holder 111 by means of a flange 110 in a releasable and airtight fashion.

In some embodiments, the flange 110 may consist, fully or partly, of a resilient material, e.g. rubber, and be configured such that it seals the sample container on the one hand and can, on the other hand, be tilted about an axis 124 that is a horizontal axis in FIG. 1 and apply a force to the sample container 105 in the axial direction of the sample container 105 (vertical in FIG. 1).

In addition to the sample container holder 111, a lower sample container support 120 may be provided. This support includes a bottom 121 on which the bottom of the sample container 105 rests and which may be slightly inclined so that the part of the bottom 121 facing away from the container 107 is spaced more widely from the sample container holder 111 than the part of the bottom 121 facing the container 107.

The lower sample container support 120 may additionally comprise lateral guide means 122, 123 configured for preventing the sample container 105 from slipping in a lateral direction.

For inserting the sample container 105, the sample container 105 can be attached to the flange 110 and moved to its filling position by applying a light pressure to the lower part of the sample container in the direction of the container 107. The result is that the sample container 105 is fixed under axial pressure between the resilient flange 110 and the lower sample container support 120. The structural design of the bottom 121 of the lower sample container support 120 and the angle between this bottom 121 and the flange 110 can be chosen such that the sample container 105 is lockingly engaged in its filling position. Due to the lateral guide means 122, 123, the sample container 105 is also secured in position in the lateral direction, so that the sample container is secured against bending and/or knocking off throughout 360°.

The sample container 105 can be removed by slightly pulling the lower part of the sample container 105 in a direction away from the container 107. Due to the axial relief of the flange 110 that has taken place during the removal of the sample container 105, a radial relief of the radial seal can be accomplished as well. The sample container 105 can thus be removed in a downward direction easily and without any jerking, i.e. without any risk of spilling the content of the sample container 105.

A pressure equalizing line 305 may connect the interior of the sample container 105 to the interior of the container 107, so that there will be essentially no pressure difference between the interior of the sample container 105 and the interior of the container 107, in which a negative pressure according to the milking vacuum provided by the milking machine prevails when the device 100 is in operation.

In addition, a sample line 307 is provided, which connects the interior of the sample container 105 to the sampling device 301. Milk can flow through the sample line 307 from the sampling device 301 into the sample container 105. The end of the sample line 307 facing the sampling device 301 may be located above the end of the sample line 307 facing the sample container 105, so that the milk will flow from the sampling device 301 downhill into the sample container 105.

Since, in view of the pressure equalizing line 305, the pressure prevailing in the interior of the sample container 105 and in the surroundings of the sampling device 301 and in the sampling device 301 itself is essentially identical, the flow of the samples into the sample container 105 is essentially independent of the magnitude of the pressure in the sample container 105 and in the container 107. Negative effects of pressure fluctuations on sampling can thus be avoided or at least reduced.

The device 100 may additionally include a strainer 206. The strainer 206 is arranged downstream of the first milk outlet opening 201 and the second milk outlet opening 203. The strainer 206 may be located in the upper part, especially in the upper half, in the upper quarter and/or in the upper eighth of the container 107, and it may extend across the whole cross-section of the container 107, so that milk entering the lower part of the container 107 will previously pass through the strainer 206.

The sampling device 301 and parts of the measurement device, such as a filling-level meter and a discharge opening (optionally variable in size) as well as a measuring equipment configured for measuring, in addition to the milk flow, other properties of the milk, may be located downstream of the strainer 206, in particular below the strainer 206.

By means of the strainer 206, solids, such as straw, chaff or insects or parts of insects, which are sucked in by the milking machine during the milking process, or viscous components of the milk, such as the so-called "Schlunzen" (coagulating milk of animals having sick udders), can be captured before such contaminations of the milk will negatively influence the function of the measurement device 102 and/or of the sampling device 301.

The strainer 206 may additionally be configured for conducting milk, which enters the interior of the container 107 through the second milk outlet opening 203, to the sampling device 301. To this end, the strainer 206 may be shaped such that it slopes obliquely in a direction from the second milk outlet opening 203 towards the sampling device 301.

At least part of the milk flowing through the strainer 206 may be held on the lower surface of the strainer 206 by cohesive forces. Since the strainer 206 slopes obliquely towards the sampling device 301, the milk flows along the lower surface of the strainer 206 and is conducted to the sampling device.

In some embodiments, the strainer 206 may be conical in shape. In these embodiments, the bypass line 209 may extend through an opening in the top of the strainer 206. A cone axis 303 of the conical strainer 206 extends through the first milk outlet opening 201. In some embodiments, the cone axis 303 of the strainer 206 may extend through the center 212 of the first milk outlet opening 201 and coincide with the axis of symmetry of the rotationally symmetric inner wall 205 as well as the vertical direction of the cup 106. The top of the strainer 206 faces upwards in a direction towards the first milk outlet opening 201. Due to the conical shape, the strainer 206 slopes obliquely downwards in a radial direction.

The sampling device 301 may be located at a larger distance from the cone axis 303 than the second milk outlet opening 203 and arranged such that a straight line, which extends through the second milk outlet opening 203 and an inlet opening of the sampling device 301, intersects the cone axis 303. Milk flowing through the second milk outlet opening 203 onto the strainer and through the strainer can thus be conducted by the strainer in a radial direction to the sampling device 301.

In embodiments comprising a conical strainer 206, also milk flowing through the first milk outlet opening 201 may flow along the strainer 206. Since the cone axis 303 extends through the first milk outlet opening 201, the milk flowing through the first milk outlet opening 201 arrives at the strainer 206 in the area of the top of the cone and can flow along the strainer radially outwards. A part of this milk can move in the direction of the sampling device 301 so that the sampling device 301 will also receive milk from the first milk outlet opening 201, in particular in the case of large flows of milk. This guarantees that current milk will be made available to the sampling device at any time.

The sampling device 301 may be provided on a wall of the container 107. Milk which flows along the strainer 206 radially outwards can thus flow along the wall and down to the sampling device 301.

In some embodiments, the sampling device 301 may be provided in a corner of the container 107, e.g. in the corner designated by reference numeral 215 in FIG. 2. The container wall components extending towards one another at an angle in this corner allow the milk to be conducted to the sampling device 301 in a particularly effective manner.

A sampling device 301 which can be used in embodiments of the present invention will be described in the following making reference to FIGS. 4a and 4b, which each show sectional drawings of the sampling device 301.

Figure 4A:
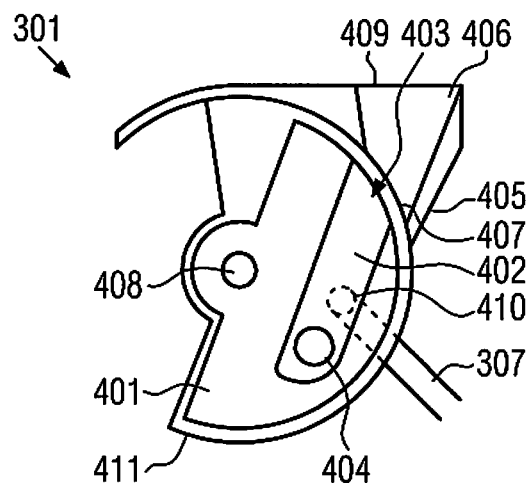
FIGS. 4a and 4b show schematic sectional drawings of a sampling device of the device shown in FIGS. 1 to 3.
Figure 4B:
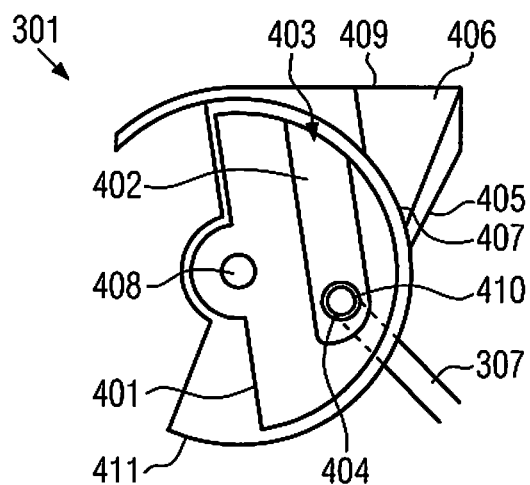

The sampling device 301 comprises a slide 401 rotatable about a shaft 408 between a first position (shown in FIG. 4a) and a second position (shown in a FIG. 4b). In addition, the sampling device 301 comprises a structure 405 which encompasses the slide 401 at least partially.

The slide 401 has a volume 402. The volume 402 is suitable for accommodating a predetermined amount of milk. In embodiments of the present invention, the volume 402 may have a size in the range of 0.5 to 2 ml, e.g. a size of 0.7 ml. The volume 402 has an inlet opening 403 located on an upper side of the volume 402 and an outlet opening 404 located below the inlet opening 403. In some embodiments, the volume 402 may have the shape of a cup, the upwardly open end of the cup serving as inlet opening 403 and the outlet opening 404 being provided in a lateral wall at the bottom of the cup.

The structure 405 may have an overflow trough 406. The overflow trough 406 has on its upper side an opening 409 which serves as an inlet opening of the sampling device 301. On the lower side, the overflow trough 406 is provided with an outlet opening 407. As will be explained in more detail in the following, milk can flow through the outlet opening 407 of the overflow trough 406 and enter the volume 402 of the slide 401 so as to fill the volume 402 with milk. The overflow trough 406 serves here as an intermediate storage means, in which milk is kept in readiness for filling the volume 402.

The volume of the overflow trough 406 may be larger than the volume 402, but so small that excess milk flowing across the overflow trough 406 will turn over the content of the overflow trough 406. By way of example, the volume of the overflow trough 406 may be in a range of 150 percent to 400 percent of the volume 402 of the slide 401. The result which can be achieved in this way is that the milk in the overflow trough 406 is, at any time, a representative sample of the milk just flowing across the sampling device 301.

In some embodiments, the overflow trough 406 may have a shape which enlarges towards the top, i.e. towards the opening 409. Particularly effective mixing of the milk in the overflow trough 406 can be achieved in this way, since this kind of shape will help to reduce milk flow backups in corners of the overflow trough 406.

The sample line 307 ends in an opening 410 of the structure 405. As will be explained in more detail hereinbelow, milk can flow, at the second position of the slide 401, through the openings 404, 410 into the sample line 307 and through the sample line 307 into the sample container 105.

The openings 404, 410 and the sample line 307 may each have a diameter of at least 6 mm so as to facilitate cleaning of the sample line 307 and of the openings 404, 410 and so as to prevent complete or partial closure of the openings 404, 410 and/or clogging of the sample line 307.

At the first position of the slide 401 (shown in FIG. 4a) the inlet opening 403 of the slide 401 is located below the outlet opening 407 of the overflow trough 406. Milk can thus flow from the overflow trough 406 into the volume 402. The outlet opening 404 of the slide 401 and the opening 410 of the sample line 307 are not in alignment with one another at the first position of the slide 401. Instead, the outlet opening 404 of the slide is closed at the first position by a wall 411 of the structure 405. Therefore, milk can only flow from the overflow trough 406 into the volume 402 until the latter is completely filled with milk.

When the slide 401 is moved from the first position to the second position (shown in FIG. 4b), the inlet opening 403 of the slide 401 is covered, but not hermetically sealed, by parts of the structure 405 adjacent the overflow trough 406 such that an air gap, which extends radially relative to the axis of the slide, is left open. In this condition, milk cannot flow into the volume 402. In addition, the outlet opening 404 of the slide 401 and the opening 410 of the sampling line 307 are in alignment with one another at the second position. Milk can thus flow through the outlet opening 404 of the slide 401 into the sampling line 307. Simultaneously, air can flow in via the air gap above the inlet opening 403 and can thus provide for pressure compensation between the interior of the container 107 and the sample bottle. However, since the inlet opening 403 of the slide 401 is, at the second position, closed by the structure 405 before the outlet opening 404 is opened, only the amount of milk which was already present in the slide 401 before and which corresponds to the volume 402 of the slide 401 flows into the sampling line 307.

Whenever the slide 401 is moved from the second position to the first position and back to the second position, an amount of milk corresponding to the volume 402 of the slide 401 will therefore be filled through the sampling line 307 into the sample container 105, independently of conditions such as the instantaneous pressure in the container 107 and the current flow of milk through the device 100.

On the side facing the viewer in FIGS. 4a and 4b, the structure may have a wall, which closes the sampling device 301 on this side and which is not shown in the sectional view of FIGS. 4a and 4b. In addition, side walls may be provided around the slide 401, so that the slide 401 is circumferentially enclosed by the structure 405, with the exception of the openings 407, 410 and one or two additional openings through which the shaft 408 of the slide 401 is passed. For optimum cleanability, a structural design that is open to the highest possible degree should, however, be preferred.

The sampling device 301 may be provided with a drive 500 for moving the slide 401 between the first and the second position. In some embodiments, this drive can be configured as described hereinbelow with reference to FIG. 5.

Figure 5:
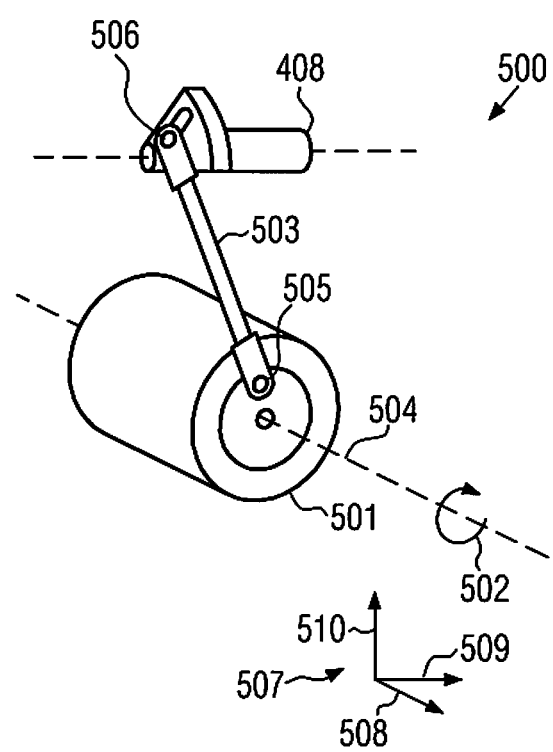
FIG. 5 shows a schematic perspective representation of a drive of the sampling device.

For illustrating the spatial arrangement of the parts 500, FIG. 5 shows a coordinate system 507 with a first coordinate axis 508, a second coordinate axis 509 and a third coordinate axis 510. The coordinate system 507 is oriented such that the shaft 408 of the slide 401 extends parallel to the second coordinate axis 509.

The drive 500 comprises a motor 501 which may e.g. be an electric motor. The motor provides a rotary motion about an axis 504 in a direction illustrated by a curved arrow 502 in FIG. 5. The axis 504 of the motor 501 extends parallel to the first coordinate axis 508 and thus perpendicular to the shaft 408 of the slide 401. In addition, the shaft 408 of the slide 401 and the axis 504 of the motor 501 are spaced apart in the direction of the third coordinate axis 510.

The drive 500 includes a rod 503. A first end 505 of the rod 503 is connected to the motor 501 and supported eccentrically to the axis 504 of the motor 501 such that, relative to the armature of the motor, it is adapted to be rotated about an axis extending parallel the first coordinate axis 508 as well as about an axis extending parallel to the second coordinate axis 509.

A second end 506 of the rod 503 is connected to the shaft 408 of the slide 401 and supported eccentrically thereto such that it is adapted to be rotated about an axis extending parallel to the first coordinate axis 508 as well as about an axis extending parallel to the second coordinate axis 509.

When the motor 501 rotates about the axis 504, the uniform rotary motion of the motor 501 is converted by the rod 503 into a back-and-forth rotary motion of the slide 401 about the shaft 408, the slide 401 moving once during each revolution of the motor 501 from the first position to the second position and back again.

As has been explained hereinbefore, a specific amount of milk corresponding to the volume 402 of the slide 401 is filled into the sample container 105 whenever the slide 401 moves from the second position to the first position and back again. Since the slide moves once from the first to the second position and back again during each revolution of the motor 501, the specific amount of milk is filled into the sample container 105 during each revolution of the motor, irrespectively of the amount of milk in the container 107 and the flow of milk through the device 100 at the moment in question. For filling a desired amount of milk into the sample container 105, a complicated control, which controls a valve in response to the flow of milk and the amount of milk in the container 107, is therefore not necessary. On the contrary, it will suffice to control the motor 501 such that it carries out a number of revolutions corresponding to the ratio between the amount of milk to be filled in the sample container and the size of the volume 402 of the slide 401. A typical number of revolutions of the engine 501 may be within a range of 0.3 to 3 revolutions per second.

The device 100 may comprise a control means accommodated in an electronics compartment 111 and configured for controlling the drive 500 of the sampling device 301 for carrying out an extraction of a milk sample. Also the drive 500 may be located in the electronics compartment 111, the shaft 408 of the slide being guided, in a rotatable as well as liquid- and air-tight fashion, through a partition between the electronics compartment 111 and the container 107.

In some embodiments of the present invention, the control means may be configured for controlling the sampling device 301 in response to the milk flow measured by the measurement device 102, such that a sample representative of the whole amount of milk milked during the milking process is filled into the sample container 105.

The fat content of cow milk, for example, exhibits a comparatively high variability during the milking process. Whereas the fat content at the beginning of the milking process may be as low as 1%, much higher fat contents of up to 15% may occur at the end of the milking process. If a disproportionately high percentage of the milk sample were taken at the beginning of the milking process, a measurement of the fat content would therefore result in a value which is lower than the value obtained from a sample of the uniformly mixed total milk yield. If, however, a disproportionately high percentage of the milk sample were taken at the end of the milking process, a measurement of the fat content would result in an excessively high value.

For taking a sample representative of the total milk yield, the sampling device may be controlled such that the slide 401 will be operated whenever the amount of milk that has flown into the device 100 has increased by a predetermined volume increase. To this end, the control means may determine a value of the amount of milk that has hitherto flown into the device 100 by temporally integrating, e.g. numerically, the milk flow into the device 100 which has been measured by the measurement device 102.

When the integrated milk flow exceeds a starting value and whenever the integrated milk flow has increased by the predetermined volume increase in comparison with the last value at which an amount of milk corresponding to the volume 402 of the slide 401 (referred to as subsample in the following) has been taken, the motor 501 can be controlled such that it will carry out one revolution and that a subsample will be filled into the sample container 105.

Since each subsample taken is representative of a specific milked quantum of milk, whose quantity corresponds to the predetermined volume increase, a milk sample representative of the whole milk yield is obtained by uniting the individual subsamples.

The predetermined volume increase in response to which a respective subsample is taken (referred to as $\Delta Q$ in the following) can be calculated from an estimated value of the milk quantity Q to be expected from the milked animal, a desired sample volume V and the volume 402 of the slide 401 (referred to as $\Delta V$ in the following), according to $$\Delta Q = \Delta V \cdot Q / V \tag{1}$$

The starting value at which a subsample is taken for the first time may be equal to half the predetermined volume increase $\Delta Q$ or, in other embodiments, correspond to the predetermined volume increase $\Delta Q$. The milk quantity to be expected can be estimated on the basis of the milk quantity obtained previously from the animal and may e.g. correspond to the quantity milked on the previous day or during the last test milking.

If, for example, the milk quantity to be expected is Q=15,000 g, e.g. 50 subsamples, of $\Delta V$=0.7 ml each, may be taken, each of them after a predetermined volume increase of $\Delta Q$=300 g. The starting value may be 300 g/2=150 g in this example. 50 subsamples, of 0.7 ml each, provide a sample volume of 35 ml, which can be filled into a sample container 105 having a volume of 50 ml. If the actually milked milk quantity does not precisely correspond to the expected milk quantity, this will result in a slightly larger or smaller sample quantity in the sample container 105, without the sample container 105 overflowing or containing an insufficient amount of milk for analysis (minimum typically approx. 20 ml).

In other embodiments, the control means may be configured for filling into the sample container 105 a sample representative of a part of the total milk yield. In particular, the control means may be configured for taking a sample representative of the beginning of the milking process or a sample representative of the end of the milking process.

A milk sample representative of a part of the milking process may, for specific substances of content, be more representative than a sample representing the total milk yield.

For example, if the animal should develop mastitis, the number of cells in the milk milked at the beginning of the milking process may be strongly increased and clearly manifest itself in the first quarter of the milk yield, whereas the number of cells measured on the basis of a sample of the total milk yield may, due to the dilution effect, still be without pathological findings.

On the other hand, the milk contains specific bacteria, so-called bacteriophages, towards the end of the milking process, which, after the end of the milking process, are concentrated in the residual milk remaining in the udder cistern. The bacteriophages combat microorganisms which may perhaps ascend through the teat canal of the teat in the time between two milking processes. A milk sample taken towards the end of the milking process can allow more reliable conclusions with respect to the presence of such protective bacteria than a milk sample that is representative of the total milk yield.

For taking a milk sample representative of a part of the milking process, the volume increase $\Delta Q$ calculated according to equation (1) may be reduced in accordance with the percentage of the milk yield from which a sample is to be taken, so as to obtain the desired sample volume although a sample is taken from only a part of the milk yield.

In some embodiments, a milk sample may be taken, which is representative of 20% of the milk yield, e.g. for the first 20% of the milk yield or the last 20% of the milked milk yield. In the case of these embodiments, the volume increase $\Delta Q$ calculated according to equation (1) may be reduced to one fifth, so that the same sample volume will be filled into the sample container 105.

In other embodiments, a milk sample may be taken, which is representative of some other fraction of the milk yield. In the case of these embodiments, the volume increase $\Delta Q$ calculated according to equation (1) may be reduced to the respective fraction.

When a milk sample representative of the beginning of the milking process is taken, an upper limit may be set for the number of subsamples, so that sampling will be finished as soon as a specific milk quantity has been milked. To this end, the control means may count the number of subsamples taken and finish sampling when the number of subsamples taken reaches the upper limit value.

When a sample representative of the end of the milking process is taken, the starting value, at which the first subsample is taken, can be set to a difference between the whole milk quantity to be expected and the milk quantity corresponding to the percentage of the milk yield with regard to which the milk sample is to be representative. The starting value may, by way of example, be set to 80% of the milk quantity expected, when a sample is taken from the last 20% of the milk yield.

As for the rest, sampling can be carried out for taking a milk sample representative of the beginning of the milking process as well as for taking a milk sample representative of the end of the milking process in a manner corresponding exactly to that which has been described hereinbefore for taking a sample representative of the total milk yield.

Figure 9:
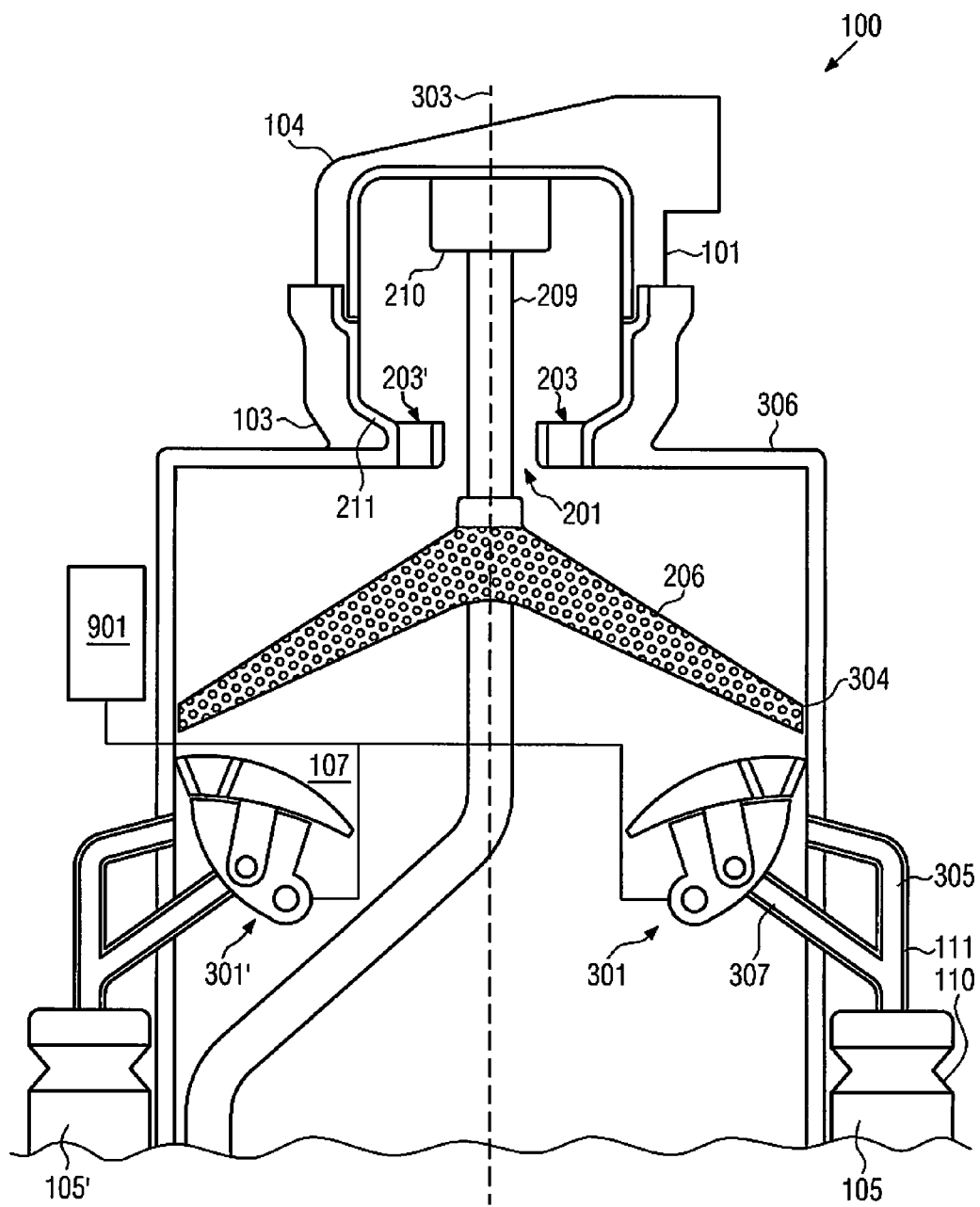

The present invention is not limited to embodiments in which, as described hereinbefore, a single sampling device is provided. As shown in FIG. 9, some embodiments may include a plurality of sampling devices 301, 301' with features corresponding to those of the above described sampling device 301. Each of the sampling devices 301, 301' may be connected, via a sample line associated therewith, to a sample container 105, 105' which is similar to the above described sample container 105.

In order to provide the plurality of sampling devices 301, 301' with a sufficient amount of milk even in the event of small milk flows, each sampling device may have associated therewith a channel similar to the above described channel 202 and a milk outlet opening 203, 203' similar to the above described second milk outlet opening 203. The channels may each extend about a part of the circumference of the first milk outlet opening 201, and the milk outlet openings 203, 203' associated with the sampling devices may be arranged such that milk exiting the air separation device 101 through the respective milk outlet opening flows to the sampling device associated therewith.

In embodiments including, as described above, a conical strainer 206, the respective milk outlet openings 203, 203' associated with the sampling devices may be arranged such that a straight line extending through the inlet opening of the sampling device 301, 301' and the milk outlet opening 203, 203' associated therewith will intersect the cone axis 303 of the strainer 206. The milk can thus flow from the respective milk outlet opening 203, 203' along the strainer 206 to the sampling device 301, 301' associated therewith.

The device may include a control means 901 configured for controlling the plurality of sampling devices for taking milk samples during a milking process, the sampling being executed as described above.

In a device including two or more sampling devices, 301, 301' one of the sampling devices 301 may be used for filling a milk sample representative of a part of the milk yield into a first sample container 105 connected therewith, whereas another sampling device may be used for filling a milk sample representative of the total milk yield into a sample container 105' connected therewith. The control means 901 may be configured for adequately controlling the sampling devices 301, 301'.

In particular, a first sampling device 301 may be used for taking a milk sample representative of the foremilk, e.g. a milk sample representative of the first 20% of the total milk yield, and for supplying it to a first sample container 105, whereas the second sampling device 301, is used for taking a milk sample representative of the total milk yield and for supplying it to a second sample container 105'. The content of the first sample container 105 may be tested, e.g. in a mastitis quick test (Schalm test). This may either be done manually, e.g. by a farmer, or automatically by means of a measuring unit integrated in the device 100. On the basis of the test result, it can then be decided whether the content of the second sample container 105' will be sent to a laboratory for closer examination.

Making use of the device 100 according to the present invention, sampling may, as described above, be executed during the milking process. When the milking process ends, the milk sample taken will already be in the sample container 105. For operating the device 100 it is therefore not necessary that the milking vacuum is still present at the end of the milking process. The device 100 can thus be used, without any restrictions, also in combination with a milking machine with automatic vacuum shut-off and/or automatic cluster removal.

The present invention is not limited to embodiments in which, as in the above-described embodiments, the upwardly open channel is arranged upstream of the first milk outlet opening 201 of the air separation device 101. In other embodiments, the upwardly open channel may also be arranged downstream of the first milk outlet opening 201 of the air separation device 101. Such embodiments will be described in the following making reference to FIGS. 6, 7 and 8.

Features of the embodiments described with reference to FIGS. 6, 7 and 8 may, unless stated differently hereinbelow, correspond to those of the embodiments described with respect to FIGS. 1 to 5, identical parts being designated by identical reference numerals.

Figure 6:
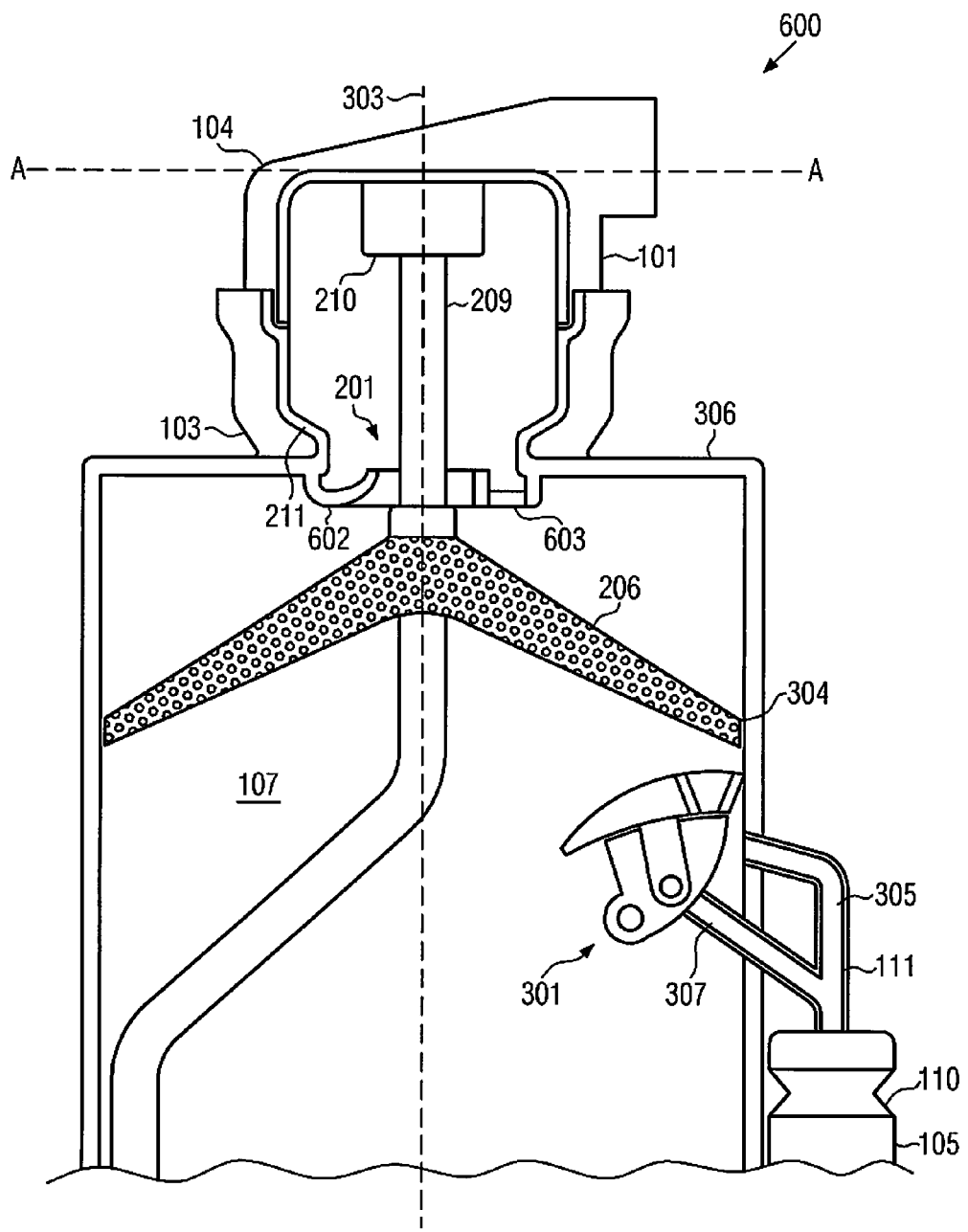
FIGS. 6 to 8 show schematic sectional drawings of devices according to further embodiments of the invention.

FIG. 6 shows a schematic cross-sectional view of a device 600 for carrying out a measurement and for taking milk samples from a milking machine according to the present invention, the sectional plane of FIG. 6 corresponding to the sectional plane of FIG. 3.

The device 600 includes an upwardly open channel 602 arranged below and downstream of a milk outlet opening 201 of the air separation device 101. The milk outlet opening 201 corresponds to the first milk outlet opening of the embodiments according to FIGS. 1 to 5, but, in order to make things easier, it will be referred to as "milk outlet opening 201" in the following, since the air separation device 101 in the embodiment according to FIG. 6 does not have a second milk outlet opening.

The channel 602 extends annularly around an area below the center of the milk outlet opening 201 and is arranged, at least partially, within the margin of the milk outlet opening 201 in the radial direction. An outer edge of the channel 602 is connected to the air separation device 101. Whereas in some embodiments the whole outer edge of the channel 602 is connected to the air separation device 101, the channel 602 may, in other embodiments, be connected to the air separation device 101 by individual webs spaced apart by gaps.

The channel 602 is provided with a milk outlet 603. The latter may, as shown in FIG. 6, be an opening in the bottom of the channel 602. In other embodiments, the milk outlet 603 of the channel 602 may also be arranged at one end or on one side of the channel 602, so that the milk flows out of the channel 602 in a horizontal direction. In such embodiments, the milk outlet 603 need not necessarily be provided in the form of an opening with an edge extending circumferentially around the opening. Alternatively, the milk outlet 603 may also include an area of the channel 602, in which the edge of the channel 602 is lower in height than in the rest of the channel 602, or is omitted completely, so that the milk will flow out of the channel 602 in this area.

Milk which flows across the edge of the milk outlet opening 201 of the air separation device 101 and through the milk outlet opening 201 arrives at the channel 602.

In the event of small milk flows, the channel 602 can collect essentially the whole amount of milk flowing through the milk outlet opening 201. Through the channel 602, the milk is conducted from the channel to the milk outlet 603 and flows out of the channel 602 at the milk outlet 603.

In the event of larger milk flows, a part of the milk can flow across the inner edge of the channel 602 and through the area at the center of the milk outlet opening 201 of the air separation device 101 onto the strainer 206 and through the strainer 206 into the container 107, said area at the center of the milk outlet opening 201 being enclosed by the channel 602. Another part of the milk can flow through the milk outlet 603 even in the case of large milk flows.

Similar to the second milk outlet opening 203 in the embodiments described above with reference to FIGS. 1 to 5, the milk outlet 603 of the channel 602 is arranged such that the milk flowing through the milk outlet 603 out of the channel 602 will be conducted by the strainer 206 to the sampling device 301. Thus, it can be guaranteed, similar to the embodiments described with reference to FIGS. 1 to 5, that the sampling device 301 will be supplied with a sufficient amount of milk even in the case of small milk flows.

Additional features of the channel 602, e.g. its depth and/or width, may correspond to those of the channel 202 shown in FIGS. 2 and 3.

Figure 7:
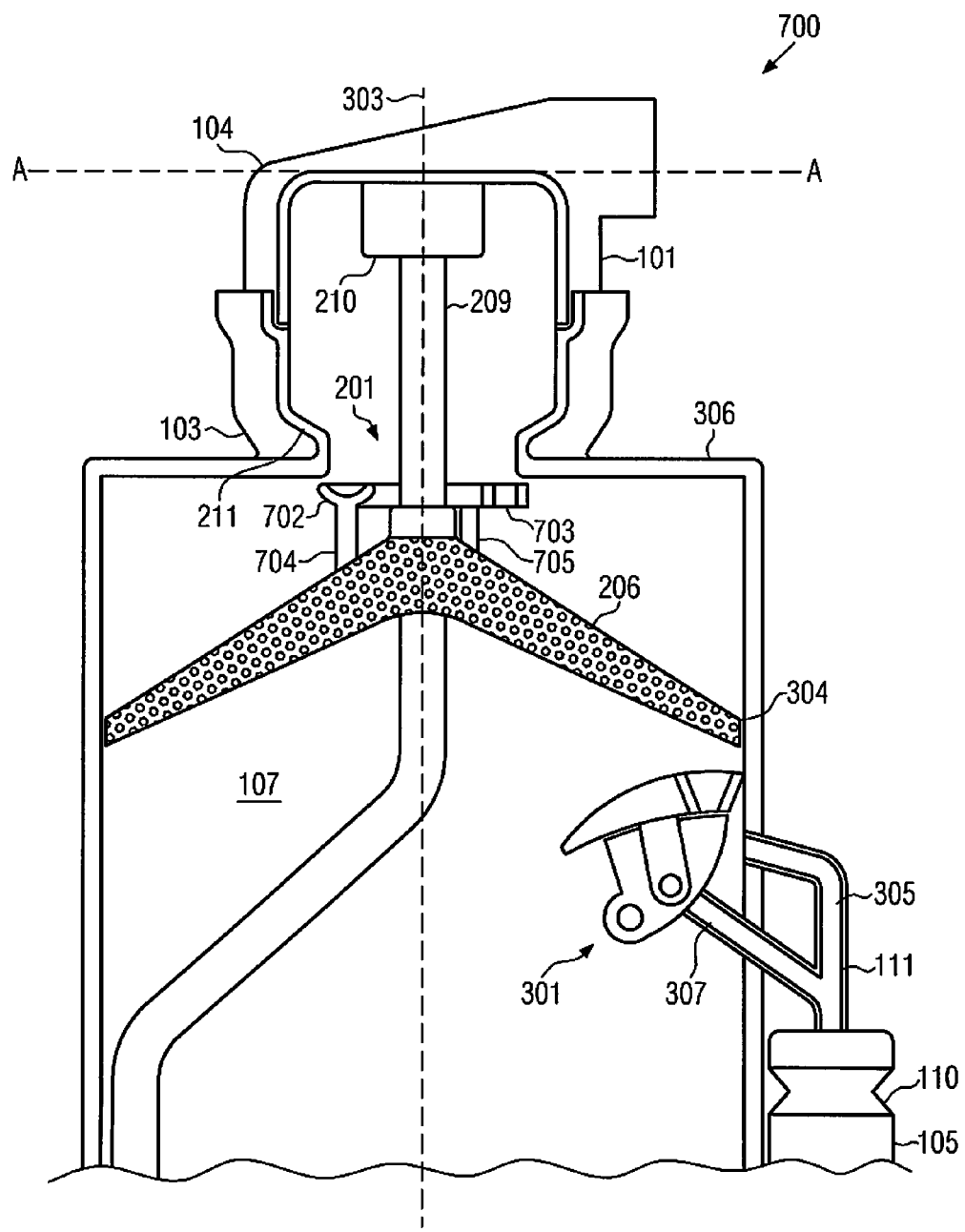

FIG. 7 shows a schematic cross-sectional view of a device 700 for carrying out a measurement and for taking milk samples from a milking machine according to a further embodiment of the present invention, the sectional plane of FIG. 7 corresponding to the sectional plane of FIGS. 3 and 6.

The device 700 includes an upwardly open channel 702 arranged downstream of a milk outlet opening 201 of the air separation device 101. The channel 702 is provided with a milk outlet 703. Similar to the channel 602 according to FIG. 6, the channel 702 is located below the milk outlet opening 201 and encloses annularly an area below the center of the milk outlet opening 201. In the radial direction, the channel 702 is arranged, at least partially, within the milk outlet opening 201.

Other than the channel 602, the channel 702 is not secured to the air separation device 101, but it is secured to the strainer 206 by interrupted webs 704, 705. It is thus possible to remove, during cleaning of the device 700, the channel 702 together with the strainer 206 from the device 700, whereby the device 700 can be cleaned more easily.

Additional features of the channel 702 and of the milk outlet 703 may correspond to those of the channel 602 and the milk outlet 603 described above with respect to FIG. 6.

Figure 8:
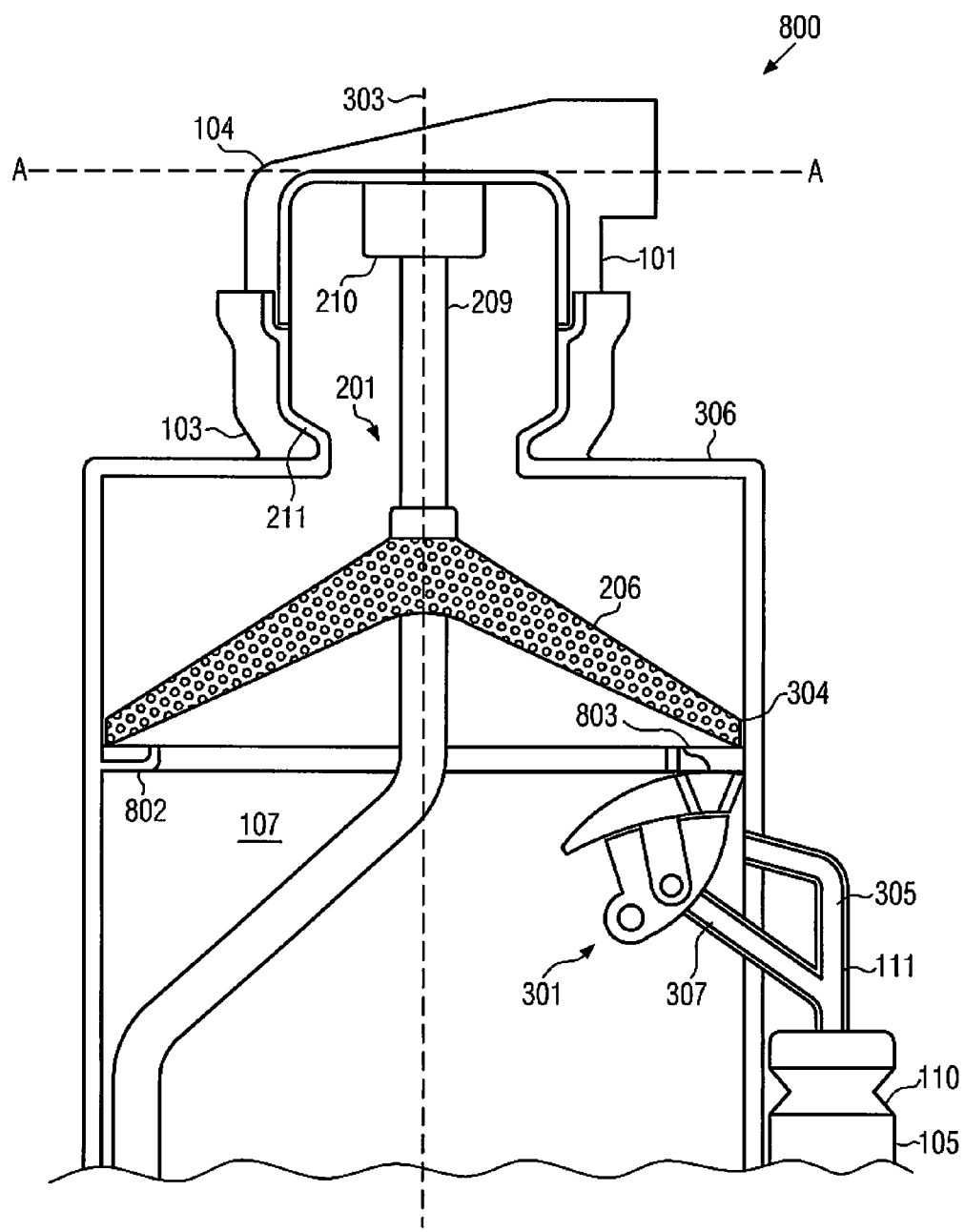

FIG. 8 shows a schematic cross-sectional view of a device 800 for carrying out a measurement and for taking milk samples from a milking machine according to the present invention, the sectional plane of FIG. 8 corresponding to the sectional plane of FIGS. 3, 6 and 7.

The device 800 includes an upwardly open channel 802. The channel 802 is located below and downstream of the strainer 206 as well as above and upstream of the sampling device 301 and the measurement device 102. The channel 802 is located on an inner wall of the container 107, at the outer edge of the strainer 206, and it extends annularly around the container 107.

The channel 802 may, as shown in a FIG. 8, be attached to the inner wall of the container 107. In other embodiments, the channel 802 may also be secured to the strainer 206, so that, during cleaning of the device 800, it can be removed, together with the strainer 206, from the container 107.

The channel 802 is provided with a milk outlet opening 803 located at the bottom of the channel 802 and arranged above the inlet opening of the sampling device 301, so that milk, which flows through the milk outlet opening 803 out of the channel 802, is supplied to the sampling device 301.

Milk, which flows through the milk outlet opening 201 of the air separation device 101, flows, at least partially, along the conically shaped strainer 206 and arrives thus at the edge of the strainer 206 and the wall of the container 107. There, the milk is collected by the channel 802 and flows through the milk outlet opening 803 of the channel 802 to the sampling device 301. This has the effect that also milk which is initially conducted by the strainer 206 in a direction other than the direction towards the sampling device 301 will be supplied through the channel 802 to the sampling device 301, whereby sampling in the case of small milk flows can be improved.

Additional features of the channel 802 may correspond to those of the channel shown in FIGS. 2 and 3.

The present invention is not limited to embodiments in which the sampling device 301 is arranged in the upper part of the container 107. In other embodiments, the sampling device 301 may also be located at a different position, e.g. in the lower part of the container 107 or outside of the container 107. In such embodiments, the sampling device 301 may be supplied with milk, which is removed upstream of the measurement device 102, through a hose or a pipe having one end arranged at, or in the vicinity of and in functional connection with the inlet opening of the sampling device 301 and its other end arranged at the edge of the container 107 below the strainer 206 (at the location at which the sampling device 301 is provided according to FIGS. 3, 6, 7 and 8).

The invention claimed is:

1. A device for carrying out at least one measurement and for taking milk samples from a milking machine, wherein the device allows milk to flow therethrough and comprises:
   an air separation device configured to separate the milk from air with which the milk is mixed;
   a measurement device which is arranged downstream of the air separation device, connected to the air separation device through a first milk outlet opening of the air separation device and configured to carry out one or a plurality of measurements with the milk flowing through the device;
   a sampling device configured to supply milk to a sample container;
   an upwardly open channel arranged upstream of the measurement device, having first and second ends and configured to accommodate at least a part of the milk which has been separated from the intermixed air in the air separation device and direct said milk such that said milk flows at least partially to the sampling device; wherein the air separation device comprises a second milk outlet opening located at the first end of the channel, the sampling device is arranged such that milk exiting the second milk outlet opening flows to the sampling device and the upwardly open channel is arranged at a downstream end of the air separation device and upstream of the first milk outlet opening and configured to direct milk to the second milk outlet opening of the air separation device.

2. The device according to claim 1, wherein at least one of a depth and a width of the channel increases from the second end of the channel to the second milk outlet opening.

3. The device according to claim 1, wherein the air separation device comprises:
   a cup with a milk inlet opening through which milk enters the cup tangentially to an inner wall of the cup;
   wherein the upwardly open channel as well as the first and the second milk outlet opening are located in the bottom of the cup; and
   the upwardly open channel extends along a circumference of the first milk outlet opening.

4. The device according to claim 3, wherein the first milk outlet opening is arranged at the center of the bottom of the cup.

5. The device according to claim 1, comprising:
a strainer arranged downstream of the first and the second milk outlet opening and sloping obliquely in a direction from the second milk outlet opening towards the sampling device so that milk exiting the air separation device through the second milk outlet opening flows along the lower surface of the strainer to the sampling device.

6. The device according to claim 5, wherein the strainer is conical in shape, a cone axis of the strainer extends through the first milk outlet opening and an inlet opening of the sampling device is arranged on an edge of the strainer.

7. The device according to claim 1, wherein the measurement device comprises a container for intermediately storing milk during the measurement.

8. The device according to claim 7, wherein the container comprises a discharge opening and the measurement device additionally comprises:
a filling-level meter configured to measure a filling level of milk in the container; and
an evaluation unit configured to calculate a flow of milk into the container from the size of the discharge opening and the filling level measured by the filling-level meter.

9. The device according to claim 7, wherein at least a part of the sampling device is located in a part of the container facing the air separation device.

10. The device according to claim 7, wherein the sample container is arranged in side-by-side relation with the container.

11. The device according to claim 1, wherein the sampling device comprises:
a slide with a volume for accommodating a milk quantity as well as with an inlet opening and an outlet opening, the slide being movable between a first and a second position;
a drive for moving the slide between the first and the second position; and
a structure which closes the outlet opening and opens the inlet opening when the slide occupies the first position, and which closes the inlet opening and opens the outlet opening when the slide occupies the second position, so that milk flows from the volume into the sample container.

12. The device according to claim 11, wherein the slide is movable between the first position and the second position by a rotary motion.

13. The device according to claim 11, wherein the measurement device is configured to measure a milk flow and the sampling device includes a controller configured to determine a milk quantity that has flowed into said device by temporarily integrating said measured milk flow and operate the slide whenever the milk quantity that has flowed into said device has increased by a volume increase.

14. The device according to claim 11, wherein the drive for moving the slide between the first and the second position includes an electric motor.

15. The device according to claim 11, wherein the structure includes an overflow trough with an outlet opening which is arranged such that, at the first position of the slide, milk flows out of the outlet opening of the overflow trough into the volume of the slide.

16. The device according to claim 1, further comprising a pressure equalizing connection configured to equalize the pressure between the sample container and the surroundings of the sampling device.

17. The device according to claim 1, further comprising a second sampling device configured to supply milk to a second sample container and arranged such that milk which exits the air separation device flows to the second sampling device.

18. The device according to claim 17, further comprising a controller configured to operate the first and the second sampling device during various phases of a milking process.

* * * * *